United States Patent
Truesdale, Jr. et al.

[11] Patent Number: 5,360,945
[45] Date of Patent: Nov. 1, 1994

[54] CABLE SEAL

[75] Inventors: Robert G. Truesdale, Jr., Cary; John E. Francis, Raleigh, both of N.C.

[73] Assignee: Raychem Corporation, Menlo Park, Calif.

[21] Appl. No.: 693,903

[22] Filed: May 1, 1991

[51] Int. Cl.[5] .......................................... H02G 15/013
[52] U.S. Cl. ................... 174/151; 174/65 R; 174/65 SS
[58] Field of Search ............... 174/151, 65 SS, 65 G, 174/77 R, 65 R, 93, 60, 84 R, 74 A, 76

[56] References Cited

U.S. PATENT DOCUMENTS

| | | | |
|---|---|---|---|
| 2,568,056 | 9/1951 | Corder | 174/93 X |
| 3,518,358 | 6/1970 | Brown | 174/138 F |
| 4,504,699 | 3/1985 | Dones et al. | 174/84 R |
| 4,751,350 | 6/1988 | Eaton | 174/87 |
| 4,868,967 | 9/1989 | Holt et al. | 174/135 X |
| 4,915,990 | 4/1990 | Chang | 174/DIG. 8 X |
| 4,963,698 | 10/1990 | Chang et al. | 174/77 R |

FOREIGN PATENT DOCUMENTS

| | | | |
|---|---|---|---|
| 0200204 | 10/1958 | Austria | 174/151 |
| 2191899A | 12/1987 | United Kingdom | H01R 13/504 |

OTHER PUBLICATIONS

G. Engel et al., IBM Technical Disclosure Bulletin, Mar. 1971.

Primary Examiner—Leo P. Picard
Assistant Examiner—Hyung S. Sough
Attorney, Agent, or Firm—Herbert G. Burkard; William D. Zahrt, II; A. Stephen Zavell

[57] ABSTRACT

A re-enterable seal (25) for sealing an elongate object (16) passing through a barrier (24) between two environments (53, 54) includes an invertible enclosing member (30) containing a sealant (40). The sealant (40) is adhered to the inside surface (31) of the enclosing member (30). During insertion of the elongate member (16), the enclosing member (30) is inverted inside-out, with the sealant remaining on the inside surface (31) (now positioned outside the enclosing member). The elongate member (16) is then pulled back, causing the enclosing member (30) to re-invert, and bringing the sealant (40) into sealing compression against the elongate member (16).

28 Claims, 9 Drawing Sheets

FIG_1
(PRIOR ART)

FIG_2

FIG_3

FIG_4

FIG_5

FIG_6

FIG_7

FIG_8

FIG_9

FIG_10

FIG_11

FIG_12

FIG_13

FIG_14

5,360,945

CABLE SEAL

BACKGROUND OF THE INVENTION

The present invention relates to environmental protection of elongate members such as cables and conductors. More particularly, the invention relates to methods and apparatus for easily and reliably inserting such a member through an environmental barrier and sealing the barrier to the member in a manner which preserves the integrity of the barrier.

Technologies for sealing conduits to barriers have been known for many years, ranging from the simple and mundane (from caulking compound to wires sealed through the base of an incandescent light bulb) to the very sophisticated (mechanical couplings into high vacuum apparatus). Requirements in the telecommunications industry may not be the most harsh, but they do present unique demands which heretofore have not been easily satisfied. That is, it is common to pass a cable through a barrier, such as a building wall or a splice closure, and to assure that the cable is sealed to the barrier so that the "inside" is protected from the elements on the "outside". However, such seals are regularly required by the thousands, so that speed, efficiency, reliability, versatility, and ease of use become very important. Modern practices leave much room for improvement.

To give a specific example, telephone cables often must be opened and spliced in locations where the resulting cable joint would be exposed to the elements. Splice housings or cable closures are commonly employed to remedy this problem. Ports in the closure admit the wires or cables and the ports include seals which protect the interior of the closure from the outside elements. To seal such ports to the wires, for example, with caulking compound would in many cases provide a satisfactory seal, but it would be a messy, time-consuming process. In many environmental situations it would not perform at all. More sophisticated barrier seals have therefore been developed. One such configuration utilizes a thermal adhesive within a heat shrinkable tube. When heat is applied to the tube, the tube shrinks around the cable and the adhesive secures them together. This provides a fast, reliable, and easily applied barrier seal. However, it also requires a separate tool, such as a heat gun, torch, or power supply.

A need therefore remains for new and improved methods and apparatus which provide seals for elongate objects, such as wires and cables, for easily and reliably inserting them through environmental barriers and sealing them to the barriers in a manner which preserves the barrier integrity. Preferably, the seals will be essentially self-actuating, as well as reusable, so that little more will be necessary than to insert the cable through the seal, upon which the cable or wire will automatically be environmentally secured to the barrier. As such, the method and apparatus should not require the use of additional tools, and should preferably be able to provide a cold seal. Also, upon removal of the wire or cable, the seal should be able to return essentially to its original configuration so that it can be used again, as desired, for another cable.

SUMMARY OF THE INVENTION

Briefly, the present invention meets the above needs and purposes with a new and improved re-enterable seal for an elongate object, and methods for sealing such an object, in which the object, such as a wire or cable, is simply pushed through the seal and then retracted a short distance, upon which an environmentally secure seal is effected. More particularly, the seal includes an invertible enclosing member which, in the preferred embodiment, has a somewhat frustoconical profile. A hole in the end of the member connects through the member between its inside and outside surfaces. A gripping means, such as an invertible O-ring, is coupled to the member for gripping the cable and causing the member to invert when the cable is moved in the appropriate direction through the member. That is, when the cable is moved in a direction which would move the opening toward the base of the enclosing member, the gripping means will then draw or pull the opening toward and through the member and its base, thereby inverting the member. Then, upon reversing the direction of the cable, the member will similarly re-invert.

In its normal, inside-in configuration, the enclosing member contains a sealant which, in the preferred embodiment, is a gel supported on the inside surface of the enclosing member. Although not necessary, the gel sealant preferably has a tapered open core substantially coaxial with the O-ring gripping means and the enclosing member hole, and dimensioned appropriately for the wire or cable to be received therethrough (of a diameter somewhat less than that of the wire). The sealant is configured to remain always on the inside surface of the member even when it is inverted inside-out. Thus, by inverting the member inside-out, the wire or cable can be inserted through the member, and thus through the environmental barrier, without contact between the sealant and the cable. Thus, no sealant gets on (or is lost to) the wire until the user reverses the enclosing member onto it. This prevents the wire from tearing the sealant, thereby eliminating the prior art need to have separate housing lids, clamps, and so forth for positioning and pushing sealants such as gels against wires and cables after they have been put in place. Then, when the member is inverted inside-in, the sealant is brought into a sealing engagement with the cable, effecting the desired environmental seal. No special tools are required; no heat is required. To remove and reuse the seal, the cable is simply extracted. Since the gel has a greater affinity for the enclosing member than for the wire and the O-ring wipes the cable, the gel will remain with the enclosing member so that the seal may be reused.

It is therefore an object of the present invention to provide new and improved methods and apparatus for easily and reliably inserting an elongate member or object through an environmental barrier and sealing the barrier to the object in a manner which preserves the integrity of the barrier; such a method and apparatus in which a seal for such an elongate object includes an invertible enclosing member having an inside surface, an outside surface, and means defining an opening connecting through the surfaces, gripping means on the member configured for gripping such an elongate object and causing the member to invert when the object is moved in a predetermined direction through the member, and sealant means on the inside surface for sealing engagement with such an elongate object, the sealant means being sufficiently compliant to remain on the inside surface when the member is inverted inside-out, and being configured to form such a sealing engagement with such an elongate object when the object is located in the opening and the member is inside-in, such that an elongate object inserted through the opening can pass through the member free from substantial contact with the sealant as the member supports the sealant outside itself, and the elongate object can then invert the enclosing member inside-in to position the sealant against the elongate object and effect a seal between the member and the object; in which the gripping means may be an O-ring; which may include folding means for connecting the gripping means to the member with less resistance to inversion than the inversion resistance of the enclosing member, to cause the folding means to invert before the enclosing member inverts; in which the folding means may be a means defining a region of reduced thickness on the member; in which the gripping means may be an invertible O-ring configured to invert with the folding means before the enclosing member inverts when an inverting force is applied to the O-ring; in which the sealant may be configured to be substantially inside the enclosing member when the member is in an inside-in condition and substantially outside the member when inverted in an inside-out condition; in which the enclosing member may be already inverted prior to the insertion of such an elongate object, or may invert during insertion of such an object; in which the enclosing member may be tapered outwardly away from the opening to cause the outside surface to avoid substantial contact with itself during inversion of the member from inside-out to inside-in; in which the sealant may be a gel; in which the gel may have a cone penetration substantially between 100 and 350 ($10^{-1}$ mm), and an ultimate elongation of at least about 200%; in which the enclosing member may be configured to place the gel in sealing compression against the elongate object when the member is inside-in; in which the sealant may be a plug of sealant substantially filling the enclosing member when in the inside-in condition, or may have an open core in the plug substantially coaxial with the opening which connects through the enclosing member surfaces; which may include means forming a stabilizing surface on the enclosing member for securing the member during inversion; in which such a stabilizing surface may be located on the enclosing member substantially opposite the opening therethrough; in which the stabilizing surface may be a boss extending circumferentially outwardly around the member for influencing the member to invert with circumferential symmetry; which may be used in conjunction with a barrier having clamp means on an opening through the barrier, such that the clamp secures the enclosing member boss across the barrier opening; in which the member may be a cable; and to accomplish the above objects and purposes in an inexpensive, uncomplicated, durable, versatile, and reliable method and apparatus, inexpensive to manufacture and implement, and readily suited to the widest possible utilization in the environmental protection and sealing of elongate members such as cables and conductors when passed through environmental barriers.

These and other objects and advantages of the invention will be apparent from the following description, the accompanying drawings, and the appended claims.

DESCRIPTION OF THE PREFERRED EMBODIMENTS

Figure 1:
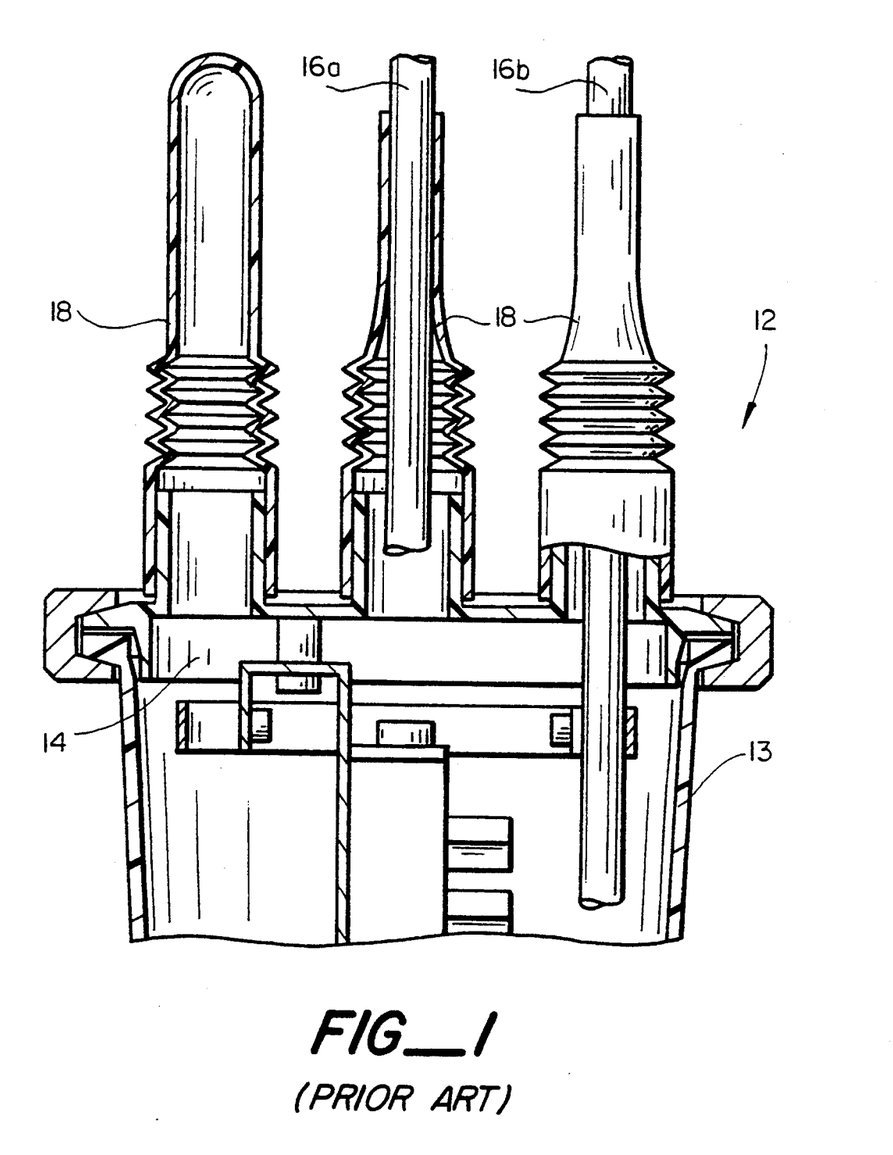
FIG. 1 is a fragmentary cross-sectional view showing prior art environmental seals for sealing cables through entry ports into a splice closure.

With reference to the drawings, the new and improved seal for elongate members, such as communication cables, and the method for making and using such seals according to the present invention, will now be described. FIG. 1 shows a prior art splice closure 12. Closure 12 includes a generally cylindrical housing 13, the open end of which is closed by an end piece 14. When housing 13 and end piece 14 are separated, access to the interior is available for performing connections, splices, and so forth on the several cables 16a and b. To seal the cables 16 through the end piece 14, the prior art splice closure system 12 uses heat shrinkable tubes 18 having a thermal adhesive (not shown) on the inside thereof. As can be inferred from FIG. 1, when it is desired to seal a cable through the end piece 14, the outer end of one of the tubes is cut off, the cable 16 is then passed therethrough as far as desired, following which heat (as from a torch or hot air gun) is applied to the tube 18 causing it to shrink around the cable 16. From an environmental standpoint, cable seals of this sort are extremely successful and reliable. The disadvantage, as discussed earlier, is that separate tools, such as a heat gun or blow torch, are necessary to provide a good seal.

Figure 2:
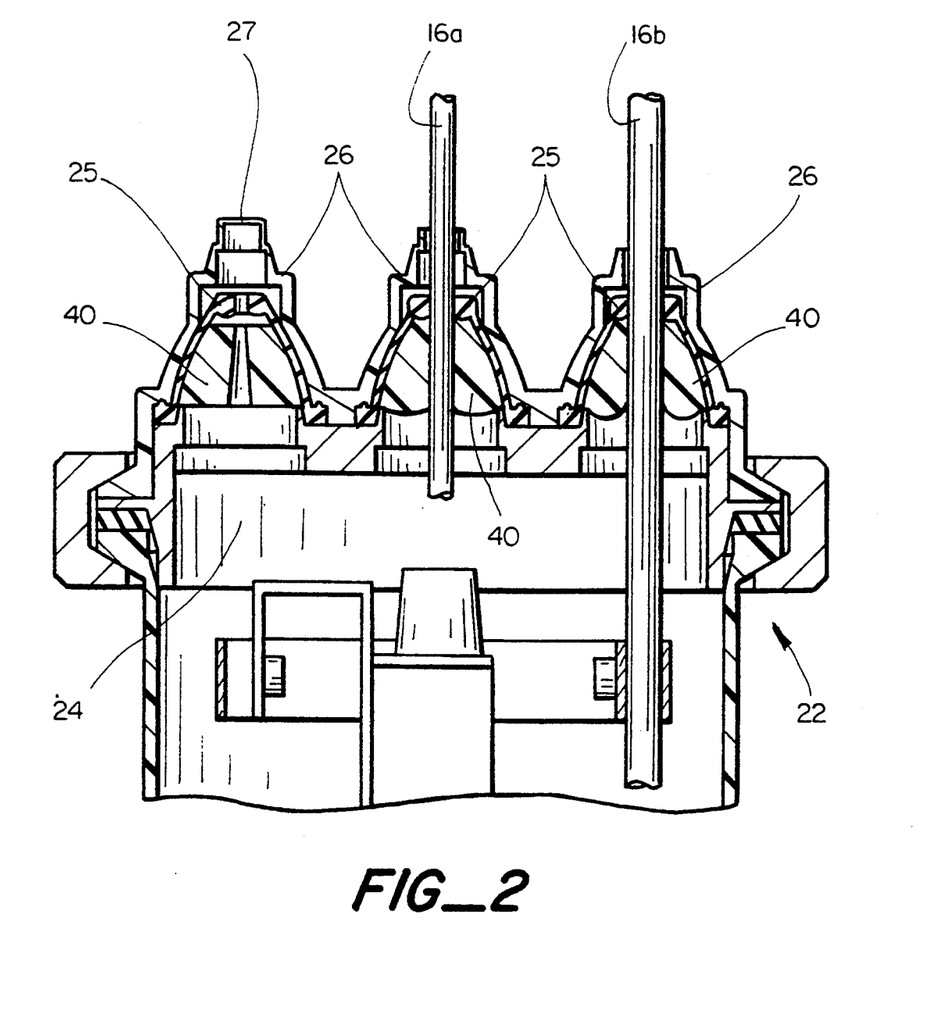
FIG. 2 is a cross-sectional view similar to FIG. 1, taken on line 2—2 in FIG. 3, showing seals according to the present invention employed in a splice closure such as in FIG. 1.
Figure 3:
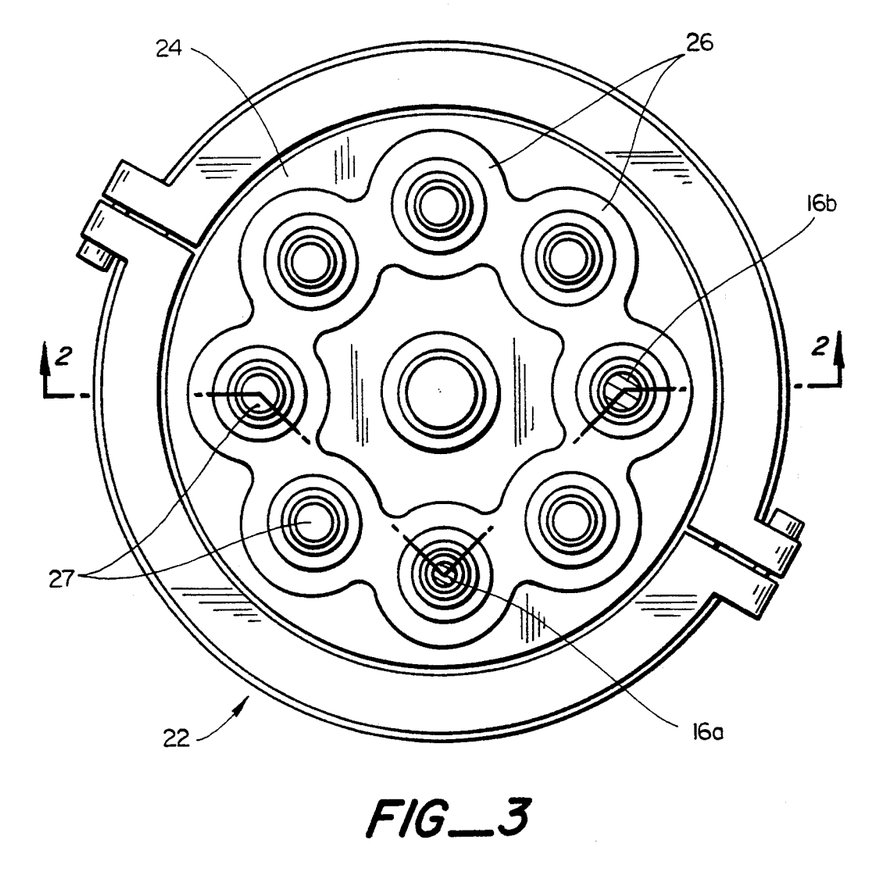
FIG. 3 is a top view of the splice closure shown in FIG. 2.
Figure 4:
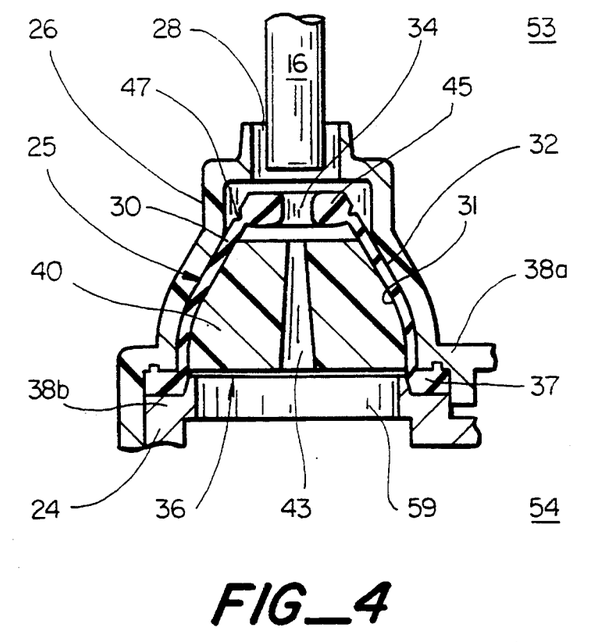
FIGS. 4–14 are sequential, cross-sectional views of a single seal and entry port, such as shown at the top left of FIG. 2, illustrating the insertion of a cable or wire through the seal followed by the sealing of the assembly onto the wire, FIGS. 4–10 showing insertion of the wire causing the enclosing member to invert inside out, and FIGS. 11–14 showing reversal of the wire causing the enclosing member to reinvert inside-in and bring the gel, for the first time, into sealing engagement against the wire or cable.
Figure 5:
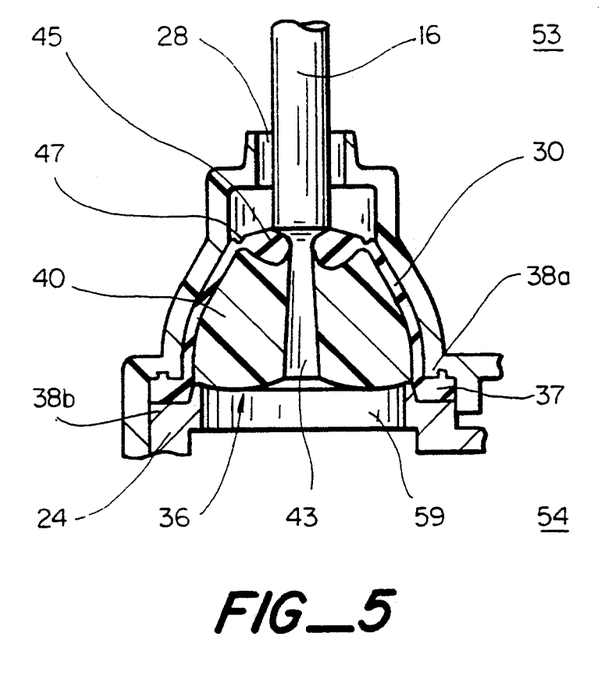
Figure 6:
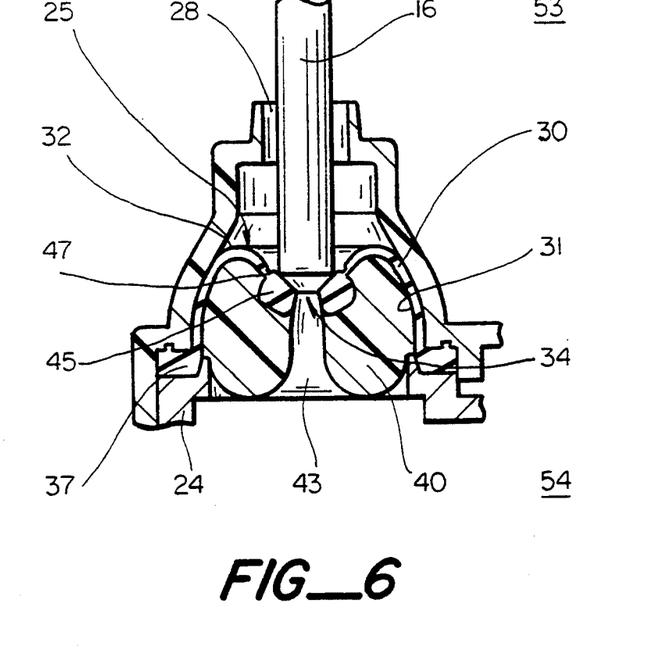
Figure 7:
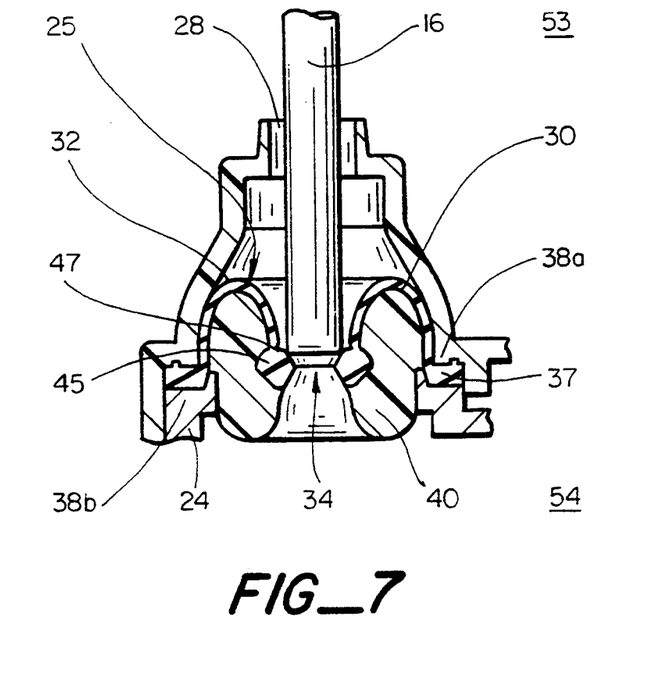
Figure 8:
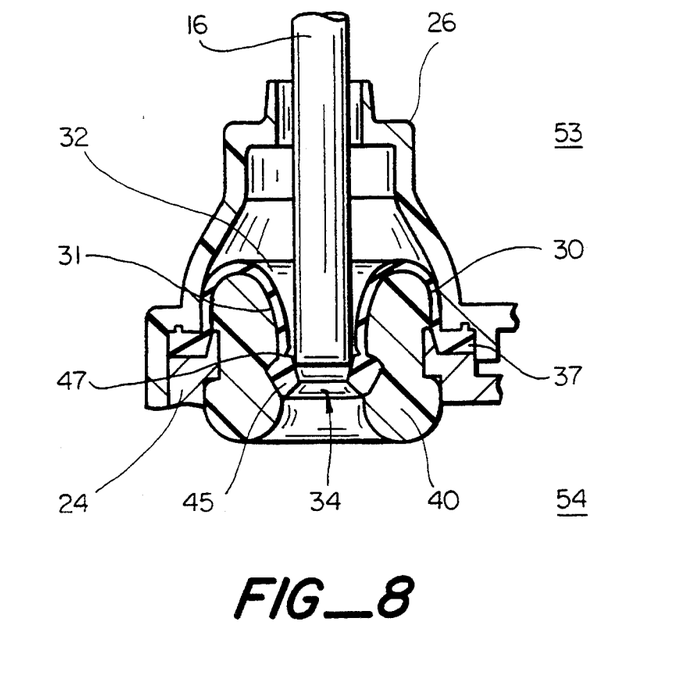
Figure 9:
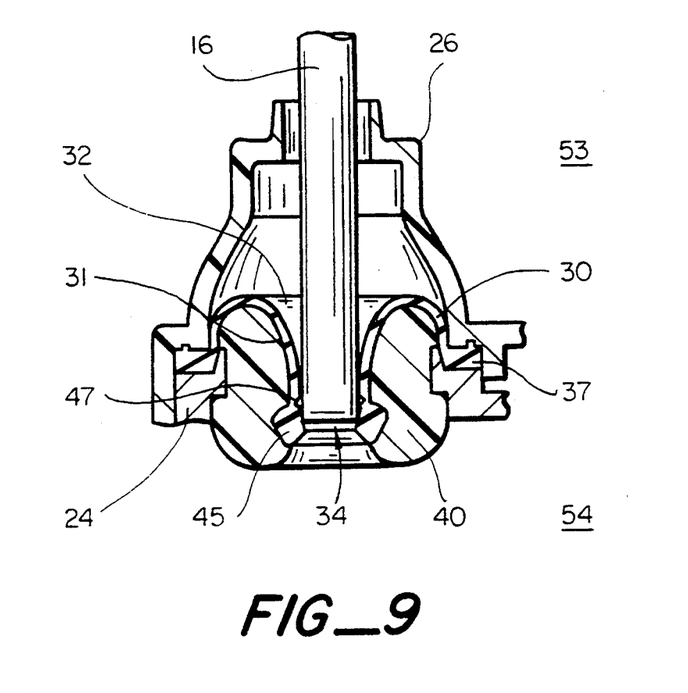

Referring now to FIG. 2, a splice closure system 22 is shown according to the present invention. Closure 22 is similar to closure 12 except that the end piece 24 of system 22 incorporates re-enterable seals 25, preferably surrounded by protective cups 26, in lieu of the prior art heat shrinkable tubes 18. The ends of cups 26 are initially closed or sealed by a removable thin panel 27. Removing panel 27 then provides an access opening 28 in the end of cup 26 for the wires 16. For a larger opening, the end of cup 26 below panel 27 may also be removed.

As shown in greater detail in FIGS. 4–14, the re-enterable seals 25, in a preferred embodiment, include an invertible enclosing member 30, having an inside surface 31, an outside surface 32, and an access port or opening 34 connecting through the surfaces 31 and 32. Opening 34 is the major access port through member 30 between the environments which the re-enterable seal 25 protects, such as, for example, the environments within and without the splice closure system 22. In the preferred embodiment, as shown, the enclosing member 30 is somewhat frusto-conical in shape, tapering outwardly away (having an increasing diameter relative to its major, longitudinal axis) from the opening 34. The end of member 30 opposite opening 34 thus terminates in an opening 36 of a much larger diameter. An outwardly extending boss 37 forming a rim around opening 36 is preferably provided for stabilizing the enclosing member 30 and influencing it to invert with circumferential symmetry, and for securing member 30 during such inversion, and for sealing around the outside of the member, as will be described further herein. As may be seen in the FIGS. 4–14, the rim may then be conveniently clamped such as between flanges 38a and b provided in the end piece 24.

A plug 40 of sealant, preferably a gel sealant, is located on the inside surface 31 of the enclosing member 30. Suitable gels are silicones, ureas, urethanes, kratons, and the like. The preferred material for the enclosing member 30 is a liquid injection molding grade of silicone rubber; the preferred material for gel 40 is a silicone gel. Suitable gels, depending upon the application and material compatibilities, include polyorganosiloxanes, polyurethanes, polyureas, styrene butadiene and/or styrene isoprene block copolymers, e.g., kratons, and combinations and mixtures thereof. Gel 40 preferably has a Voland hardness of from about 120 g (hard gel) to about 5 g (soft gel), with an ultimate elongation of greater than 200%. Gel 40 is thus sufficiently compliant to remain on the inside surface 31 when member 30 is inverted inside-out (FIG. 10), thus being substantially outside the enclosing member when the member is inside-out, and substantially inside the member when inverted in an inside-in condition.

In the preferred embodiment, the small diameter gel core 43 is open, the opening 43 having a tapered shape slowly enlarging, from a large void at its narrow end, in a direction away from the access opening 34. Preferably, core opening 43 will have an overall diameter less than the diameter of the wire or cable 16 which is to be received therein. The rim 45 of opening 34 on enclosing member 30 is thickened to provide, in cross-section, an O-ring 45 which serves to grip the cable 16 when it is pushed through opening 34. O-ring 45, as can be seen from FIGS. 4–14 and as will be further described below, is invertible, and is connected to the main body of enclosing member 30 by a thinner annular section 47. Section 47 defines a region of reduced thickness on the enclosing member for connecting the O-ring gripping means 45 to the rest of the member. The thinner region 47 thus serves as a folding means which, because it is thinner than the remainder of member 30, has less resistance to inversion than the inversion resistance of the remainder of the enclosing member 30. Thus, as the cable 16 is initially pushing its way through opening 34, the folding means 47 facilitates inversion of the O-ring and of the adjacent, narrower diameter end of enclosing member 30, as the folding means 47 inverts before the remainder of the enclosing member (see FIG. 5). Thus the enclosing member 30 and the gel sealant 40 together comprise the re-enterable seal 25 for elongate objects such as a wire or cable 16.

Referring now to FIGS. 4–10, there is illustrated the sequence in which the cable 16 is inserted through the re-enterable seal 25. Initially, as may be seen in FIG. 2, the cups 26 provide an effective environmental barrier between a first environment 53 and a second environment 54. After the end of the cup has been removed, and upon initial insertion of the wire 16 (FIG. 5), the folding means 47 facilitates inversion of the O-ring 45, assuring that the sealant will not contact the cable 16. This is advantageous for several reasons. For example, the sealant is less likely to shear or tear if it is not contacted and thus pushed toward the broader open end 36 of the enclosing member 30, where the sealant is not supported. Also, some sealants may act as lubricants which, if deposited onto the cable 16, would then interfere with the re-inversion of the enclosing member 30 which follows later (FIGS. 11–14).

Figure 10:
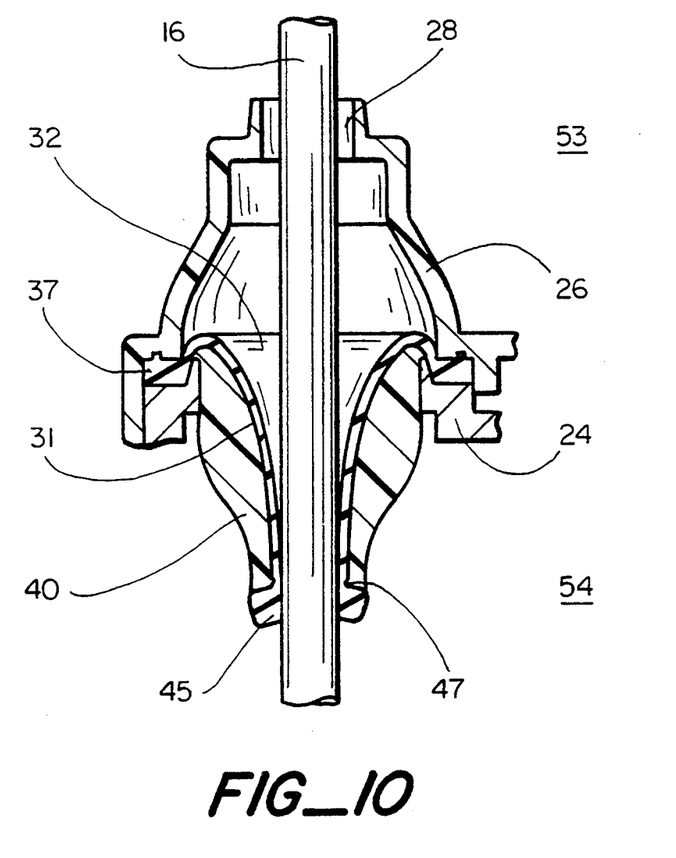

As the cable 16 progresses through the interior of enclosing member 30, as shown in FIGS. 6–9, it pushes O-ring 45 toward opening 36, turning member 30 inside-out. As shown, the gel sealant 40 remains on the inside surface 31, thus being carried to a position temporarily on the outside of member 30 (member 30's outside surface 32 now being on the inside). In FIG. 10, an additional length (not shown) of cable 16 has been pushed through into environment 54. That additional length, at the discretion of the user, Is sufficient to meet the user's needs, and in addition should be sufficient to allow comfortably for a partial retraction of the cable as illustrated in FIGS. 11–14, to effect re-inversion of the re-enterable seal 25.

Figure 11:
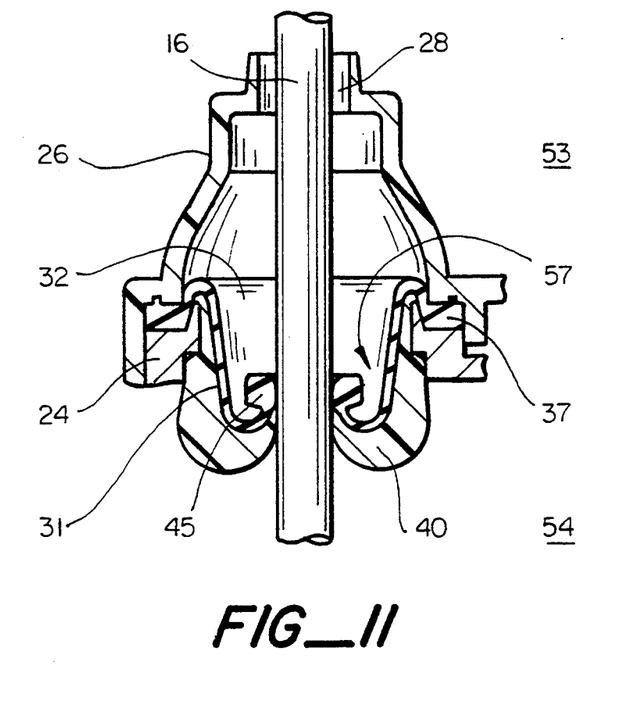
Figure 12:
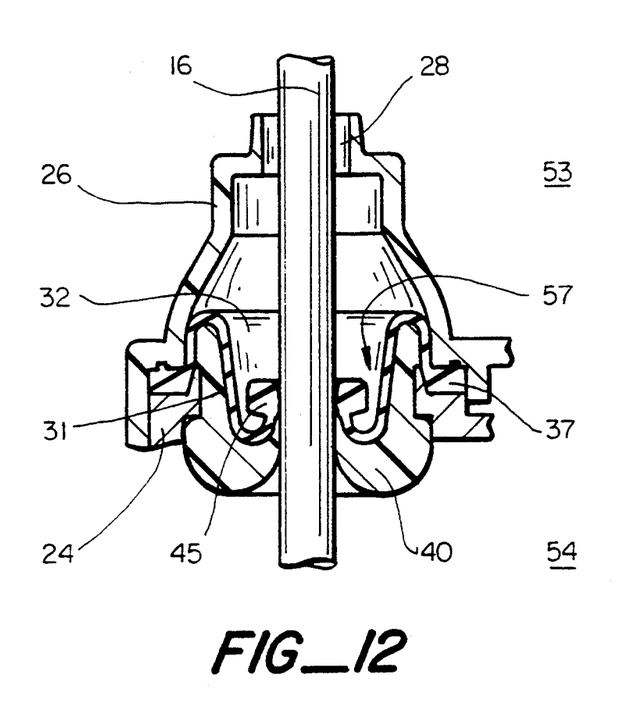
Figure 13:
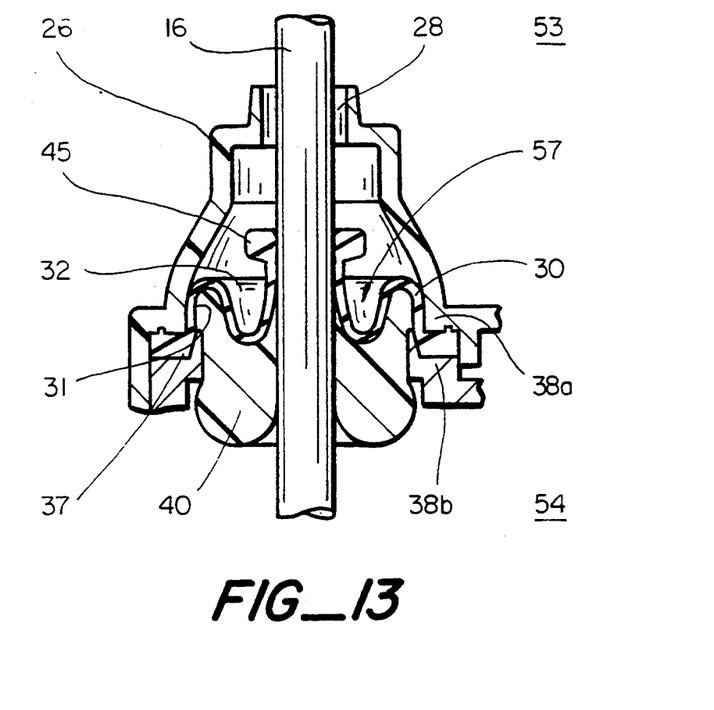
Figure 14:
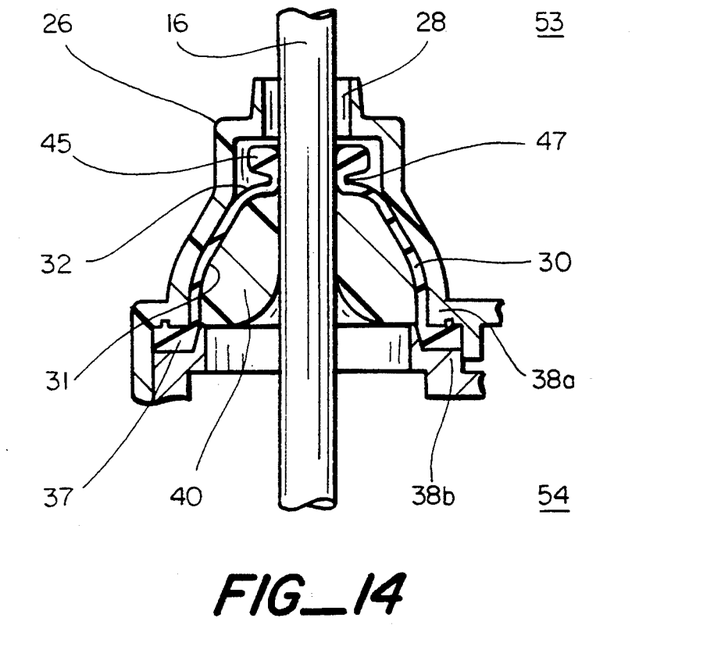

Referring now to FIGS. 11–14, the arrows on cable 16 indicate that the cable is now being retracted. The primary gripping function of the O-ring 45 now comes into play. By gripping the cable 16 with sufficient force, the O-ring follows the cable 16 as it is drawn back out toward environment 53. This causes the O-ring 45 and folding means 47 to re-invert and to start re-inverting the balance of the enclosing member 30 to draw member 30 back to its original position. At the same time, the gel sealant 40 is folded back inside, such that it is now brought into sealing engagement with the cable 16. As can be seen in FIGS. 11–13, the somewhat conically shaped taper of enclosing member 30, in the direction from opening 34 toward opening 36 (see FIG. 4), enables the enclosing member outside surface 32 to avoid contact with itself during inversion of member 30 from inside-out to inside-in. Arrow 57 (FIGS. 11–13) points to the narrow space or gap which separates the facing portions of surface 32 during its inversion. Then, as the enclosing member 30 re-inverts to its inside-in configuration, the gel sealant 40 is brought into, or positioned in, sealing compression against the elongate cable 16.

To reuse the re-enterable seal 25, the cable 16 is simply removed by pulling it back out in the opposite direction from which it was originally inserted, that is, in the direction toward environment 53. The surface tension affinity of the gel 40 with the member 30 is greater than that with the substrate or wire 16, so that the gel does not rip loose from member 30 when the wire or cable 16 is moved through the gel while in contact with it. Also, the O-ring 45, and the generally inwardly tapered shape of enclosing member 30 in that direction, provide good support for the sealant 40, so that the sealant is not substantially injured or extruded during such removal of the cable 16. A sealant such as the gels described herein, in the preferred embodiment, has sufficient memory that it then resumes its original shape, ready to provide environmental integrity and sealing upon the insertion of another cable 16.

Of course, various modifications of the present invention will occur to those skilled in the art. For example, open core 43 may be omitted. This will result in a blob or button of excess gel around the larger opening 36 when a wire or cable is present within the seal 25, but also furnishes additional material for securing the environmental seal when the cable is subsequently removed. Thus, the presence of a core 43, and its dimensions, will be entirely within the discretion of the practitioner according to the environmental demands and the specific properties of the materials chosen.

Similarly, it is conceivable that the re-enterable seal 25 might be initially configured in its inverted shape, such as illustrated in FIG. 10, prior to insertion of the cable. Also, the protective cups 26 are helpful when used with splice closure systems such as shown in FIG. 2, where the more flexible member 30 might be subjected to physical distortion from external hard objects in environment 53. Cups 26 also provide additional gel compression by limiting the expansion of member 30 when the gel is compressed. In the preferred embodiment, the clearance in opening 28 between the wire and the cup will be closer than illustrated, to provide strain relief for the wire. The clearance is slightly exaggerated in the drawings for clarity of illustration. In any case, such a protective cup is again discretionary with the practitioner. So likewise are the clamp means 38a and b which secure the stabilizing boss 37 across the opening 59 through the end piece 24 (end piece 24 itself functioning as an environmental barrier). Additionally, depending again on the particular application at hand, suitable sealants other than gels may be contemplated within the scope of the present invention.

As may be seen, therefore, the present invention provides numerous advantages. Principally, it provides a very convenient, reliable, and quick means for inserting an elongate member through an environmental barrier while sealing the member to the barrier and protecting the integrity thereof. No special tools or appliances or application techniques are required. No torches or heat guns, which can present a fire hazard, are needed. The invention is re-enterable and reusable. Little if any of the sealant is lost to the elongate member, such as a cable, when it is withdrawn from the seal, and little or none makes contact with the cable while it is first being inserted. Thus the gripping means (O-ring 45) is easily moved by the cable 16 as desired for inverting and re-inverting the enclosing member 30. It will further be appreciated that in situations wherein the ambient pressure on the outside surface 32 of enclosing member 30 exceeds that on the inside surface 31, which would correspond to an ambient pressure in environmental zone 53 greater than that in 54, the result will be to increase the radial compression of the gel against the cable. This further enhances the effectiveness of the environmental seal provided by the present invention. Similarly, increased pressure in the reverse direction compresses the gel against the cable, enhancing the effectiveness of the seal.

Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. In combination, a cable and re-enterable cable seal, comprising:
   a) an invertible enclosing member having an inside surface and an outside surface,
   b) invertible O-ring gripping means on said member for defining a resilient opening connecting through said surfaces and for gripping said cable and causing said member to invert when said cable is moved in a predetermined direction through said member while said cable is positioned through said gripping means,
   c) said enclosing member being tapered outwardly away from said gripping means to cause said outside surface to avoid contact with itself during inversion of said member from inside-out to inside-in,
   d) folding means defining a region of reduced thickness on said enclosing member for connecting said gripping means to said member with less resistance to inversion than the inversion resistance of said enclosing member to cause said folding means to invert before said enclosing member inverts,
   e) said gripping means being configured to invert with said folding means before said enclosing member inverts when said cable applies an inverting force to said gripping means,
   f) boss means on said enclosing member substantially opposite said gripping means and forming a stabilizing boss extending circumferentially outwardly around said enclosing member for influencing said member to invert with circumferential symmetry, and for securing said member during such inversion, and
   g) a plug of gel sealant on said inside surface for sealing engagement with said cable, means defining a tapered open core in said plug substantially coaxial with said O-ring gripping means and said opening, said plug otherwise substantially filling said enclosing member when in an inside-in condition, said gel having a cone penetration substantially between 100 and 350 ($10^{-1}$ mm) and an ultimate elongation of at least 200% and being sufficiently compliant to remain on said inside surface when said member is inverted inside-out, such that said gel sealant is substantially inside said enclosing member when said member is in the inside-in condition and substantially outside said member when inverted in an inside-out condition, said gel sealant being configured to form such a sealing engagement with said cable when said cable is located in said opening and said member is inside-in, and said enclosing member being configured to place said gel in sealing compression against said cable when said member is inside-in, whereby said cable, when inserted through said opening, can pass through said member free from substantial contact with said gel as said member supports said gel outside itself, and said cable can then invert said enclosing member to turn said member inside-in to position said gel sealant in sealing compression against said cable to effect a seal between said member and said cable while permitting said cable to pass therethrough.

2. In combination, a cable and cable seal, comprising:
   a) an invertible enclosing member having an inside surface, an outside surface, and means defining an opening connecting through said surfaces,
   b) gripping means on said member configured for gripping said cable and causing said member to invert when said cable is moved in a predetermined direction through said member, and
   c) sealant means on said inside surface for sealing engagement with said cable, said sealant means, in combination with the characteristics of said invertible member, being sufficiently compliant to remain on said inside surface when said member is inverted inside-out, and being configured to form such a sealing engagement with said cable when said cable is located in said opening and said member is inside-in, whereby said cable can be inserted through said opening and pass through said member free from substantial contact with said sealant means as said member supports said sealant means outside itself, and said cable can then invert said enclosing member inside-in to position said sealant means against said cable and effect a seal between said member and said cable.

3. A method for sealing a cable, comprising:
a) gripping the cable in an invertible enclosing member, the member having an inside surface, an outside surface, and means defining an opening connecting through the surfaces,
b) inverting the member when the cable is moved in a predetermined direction through the member, and
c) with a sealant means on the inside surface of the member, forming a sealing engagement with the cable when the cable is located in the opening and the member is inside-in, the sealant means, in combination with the characteristics of the invertible member, being sufficiently compliant to remain on the inside surface when the member is inverted inside-out, whereby the cable inserted through the opening can pass through the member free from substantial contact with the sealant means as the member supports the sealant means outside itself, and the cable can then invert the enclosing member inside-in to position the sealant means against the cable and effect a seal between the member and the cable.

4. In combination, a cable and cable seal, comprising:
a) an invertible enclosing member having an inside surface, an outside surface, and means defining an opening connecting through said surfaces,
b) means for causing said member to invert when said cable is in said member, and
c) sealant means on said inside surface for sealing engagement with said cable, said sealant means, in combination with the characteristics of said invertible member, being sufficiently compliant to remain on said inside surface when said member is inverted inside-out, and being configured to form such a sealing engagement with said cable when said cable is located in said opening and said member is inside-in, whereby said cable can be inserted through said opening and pass through said member free from substantial contact with said sealant means as said member supports said sealant means outside itself, and said cable can then invert said enclosing member inside-in to position said sealant means against said cable and effect a seal between said member and said cable.

5. A method for sealing a cable, comprising:
a) gripping the cable in an invertible enclosing member, the member having an inside surface, an outside surface, and means defining an opening connecting through the surfaces.
b) inverting the member by moving the cable in a predetermined direction through the member, and
c) with a sealant means on the inside surface of the member, forming a sealing engagement with the cable when the cable is located in the opening and the member is inside-in, the sealant means, in combination with the characteristics of the invertible member, being sufficiently compliant to remain on the inside surface when the member is inverted inside-out, whereby a cable inserted through the opening can pass through the member free from substantial contact with the sealant means as the member supports the sealant means outside itself, and the cable can then invert the enclosing member inside-in to position the sealant means against the cable and effect a seal between the member and the cable.

6. A seal for an elongate object, comprising:
a) an invertible enclosing member having an inside surface, an outside surface, and means defining an opening connecting through said surfaces,
b) gripping means on said member configured for gripping the elongate object and causing said member to invert when the object is moved in a predetermined direction through said member, and
c) sealant means on said inside surface for sealing engagement with the elongate object, said sealant means being sufficiently compliant to remain on said inside surface when said member is inverted inside-out, and being configured to form such a sealing engagement with the elongate object when the object is located in said opening and said member is inside-in, whereby the elongate object inserted through said opening can pass through said member free from substantial contact with said sealant means as said member supports said sealant means outside itself, and the elongate object can then invert said enclosing member inside-in to position said sealant means against the elongate object and effect a seal between said member and the object.

7. The seal of claim 6 wherein said gripping means further comprises an O-ring.

8. The seal of claim 6 further comprising folding means for connecting said gripping means to said member with less resistance to inversion than the inversion resistance of said enclosing member to cause said folding means to invert before said enclosing member inverts.

9. The seal of claim 8 wherein said folding means further comprises means defining a region of reduced thickness on said member.

10. The seal of claim 8 wherein said gripping means further comprises an invertible O-ring configured to invert with said folding means before said enclosing member inverts when an inverting force is applied to said O-ring.

11. The seal of claim 6 wherein said sealant means is configured to be substantially inside said enclosing member when said member is in an inside-in condition and substantially outside said member when inverted in an inside-out condition.

12. The seal of claim 6 wherein said enclosing member is configured to invert during insertion of the elongate object.

13. The seal of claim 6 wherein said enclosing member is already inverted prior to the insertion of the elongate object.

14. The seal of claim 6 wherein said enclosing member is tapered outwardly away from said opening to cause said outside surface to avoid substantial contact with itself during inversion of said member from inside-out to inside-in.

15. The seal of claim 6 wherein said sealant means further comprises a gel.

16. The seal of claim 15 wherein said gel comprises a gel having a cone penetration substantially between 100 and 350 ($10^{-1}$ mm), and an ultimate elongation of at least 200%.

17. The seal of claim 15 wherein said enclosing member is configured to place said gel in sealing compression against the elongate object when said member is inside-in.

18. The seal of claim 6 wherein said sealing means further comprises a plug of sealant, and means defining an open core in said plug substantially coaxial with said opening.

19. The seal of claim 6 further comprising means forming a stabilizing surface on said enclosing member for securing said member during inversion.

20. The seal of claim 19 wherein said stabilizing surface is located on said enclosing member substantially opposite said opening.

21. The seal of claim 19 wherein said stabilizing surface further comprises means defining a boss extending circumferentially outwardly around said member for influencing said member to invert with circumferential symmetry.

22. The seal of claim 21 further comprising a barrier, means defining an opening through said barrier, and clamp means on said barrier for securing said enclosing member boss to said barrier opening.

23. The seal of claim 6 further comprising a barrier, means defining an opening through said barrier, and means for securing said seal across said barrier opening.

24. A re-enterable seal for an elongate object, comprising:
  a) an invertible enclosing member having an inside surface and an outside surface.
  b) invertible O-ring gripping means on said member for defining a resilient opening connecting through said surfaces and for gripping the elongate object and causing said member to invert when the object is moved in a predetermined direction through said member,
  c) said enclosing member being tapered outwardly away from said gripping means to cause said outside surface to avoid contact with itself during inversion of said member from inside-out to inside-in.
  d) folding means defining a region of reduced thickness on said enclosing member for connecting said gripping means to said member with less resistance to inversion than the inversion resistance of said enclosing member to cause said folding means to invert before said enclosing member inverts,
  e) said gripping means being configured to invert with said folding means before said enclosing member inverts when an inverting force is applied to said gripping means,
  f) boss means on said enclosing member substantially opposite said gripping means and forming a stabilizing boss extending circumferentially outwardly around said enclosing member for influencing said member to invert with circumferential symmetry and for securing said member during such inversion, and
  g) a plug of gel sealant on said inside surface for sealing engagement with the elongate object, means defining a tapered open core in said plug substantially coaxial with said O-ring gripping means and said hole opening, said plug otherwise substantially filling said enclosing member when in an inside-in condition, said gel having a cone penetration substantially between 100 and 350 ($10^{-1}$ mm) and an ultimate elongation of at least 200% and being sufficiently compliant to remain on said inside surface when said member is inverted inside-out, such that said gel sealant is substantially inside said enclosing member when said member is in the inside-in condition and substantially outside said member when inverted in an inside-out condition, said gel sealant being configured to form such a sealing engagement with the elongate object when the object is located in said opening and said member is inside-in, and said enclosing member being configured to place said gel in sealing compression against the elongate object when said member is inside-in, whereby the elongate object inserted through said opening can pass through said member free from substantial contact with said gel as said member supports said gel outside itself, and the elongate object can then invert said enclosing member in turn said member inside-in to position said gel sealant in sealing compression against the elongate object to effect a seal between said member and the elongate object while permitting the elongate object to pass therethrough.

25. The seal of claim 24 further comprising a barrier, means defining an opening through said barrier, and clamp means on said barrier securing said enclosing member boss to said barrier opening.

26. A method for sealing an elongate object, comprising:
  a) gripping the elongate object in an invertible enclosing member, the member having an inside surface, an outside surface, and means defining an opening connecting through the surfaces,
  b) inverting the member when the object is moved in a predetermined direction through the member, and
  c) with a sealant means on the inside surface of the member, forming a sealing engagement with the elongate object when the object is located in the opening and the member is inside-in, the sealant means being sufficiently compliant to remain on the inside surface when the member is inverted inside-out, whereby the elongate object inserted through the opening can pass through the member free from substantial contact with the sealant means as the member supports the sealant means outside itself, and the elongate object can then invert the enclosing member inside-in to position the sealant means against the elongate object and effect a seal between the member and the object.

27. The method of claim 26 further comprising supporting the sealant means substantially inside the enclosing member when the member is in an inside-in condition and substantially outside the member when inverted in an inside-out condition.

28. A method for re-enterably sealing an elongate object, comprising:
  a) gripping the elongate object in an O-ring gripping means on an invertible enclosing member, the member having an inside surface and an outside surface, and the O-ring gripping means defining a resilient opening connecting through the surfaces,
  b) inverting the member when the object is moved in a predetermined direction through the member,
  c) by tapering the enclosing member outwardly away from the gripping means, avoiding substantial contact of the enclosing member outside surface with itself during inversion of the member from inside-out to inside-in.

d) inverting a folding means and the gripping means before the enclosing member inverts when an inverting force is applied to the gripping means,
e) securing the enclosing member during inversion and influencing the member to invert with circumferential symmetry by means of a stabilizing boss means on the enclosing member substantially opposite the gripping means and extending circumferentially outwardly around the enclosing member, and
f) with a plug of gel sealant on the inside surface of the member, forming a sealing engagement with the elongate object when the object is located in the opening and the member is inside-in, the plug of sealant having a tapered open core substantially coaxial with the O-ring gripping means and the opening, the plug otherwise substantially filling the enclosing member when in an inside-in condition, the gel sealant plug being sufficiently compliant to remain on the inside surface when the member is inverted inside-out, such that the gel sealant is substantially inside the enclosing member when the member is in the inside-in condition and substantially outside the member when inverted in an inside-out condition, the gel having a cone penetration substantially between 100 and 350 ($10^{-1}$ mm) and an ultimate elongation of at least 200%, whereby the elongate object inserted through the opening can pass through the member free from substantial contact with the gel as the member supports the gel outside itself, and the elongate object can then invert the enclosing member to turn the member inside-in to position the gel sealant in sealing engagement against the elongate object to effect a seal between the member and the elongate object while permitting the elongate object to pass therethrough.

* * * * *